(12) United States Patent
El-Sheimy et al.

(10) Patent No.: US 11,959,749 B2
(45) Date of Patent: Apr. 16, 2024

(54) MOBILE MAPPING SYSTEM

(71) Applicant: Profound Positioning Inc., Calgary (CA)

(72) Inventors: Naser El-Sheimy, Calgary (CA); Amr Al-Hamad, Calgary (CA)

(73) Assignee: Profound Positioning Inc., Calgary (CA)

(*) Notice: Subject to any disclaimer, the term of this patent is extended or adjusted under 35 U.S.C. 154(b) by 0 days.

(21) Appl. No.: 14/746,819

(22) Filed: Jun. 22, 2015

(65) Prior Publication Data

US 2017/0227361 A1 Aug. 10, 2017

Related U.S. Application Data

(60) Provisional application No. 62/014,984, filed on Jun. 20, 2014.

(51) Int. Cl.
  *G01C 11/02* (2006.01)
  *G01C 11/12* (2006.01)
  (Continued)

(52) U.S. Cl.
  CPC .............. *G01C 21/20* (2013.01); *G01C 11/02* (2013.01); *G01C 11/12* (2013.01); *G01C 11/34* (2013.01);
  (Continued)

(58) Field of Classification Search
  CPC ...... G01C 21/165; G01C 21/20; G01C 11/02; G01C 11/12; G01C 11/34; G01C 21/1654; G01C 21/1656; G06T 7/70; G06T 2200/04; G06T 7/74; G06T 2207/30184; G06T 2207/30244; G06T 2207/30252;
  (Continued)

(56) References Cited

U.S. PATENT DOCUMENTS 6,009,359 A * 12/1999 El-Hakim .............. G01C 11/02
  348/135
8,339,394 B1 * 12/2012 Lininger ................. G06T 19/20
  345/419

(Continued)

OTHER PUBLICATIONS

El-Sheimy ("The Development of Vista—A Mobile Survey System for GIS Applications," Ph.D. Dissertation, The University of Calgary, 1996).*

(Continued)

*Primary Examiner* — Yubin Hung
(74) *Attorney, Agent, or Firm* — BORDEN LADNER GERVAIS LLP

(57) ABSTRACT

Embodiments of systems and methods for a mobile mapping system are described. In an embodiment, a method includes capturing a plurality of images of an object point using a mobile computing platform. The method may also include determining an initial set of orientation parameters in response to one or more orientation sensors on the mobile computing platform. Additionally, the method may include calculating a corrected set of orientation parameters by matching object points in the plurality of images. Further, the method may include estimating a three-dimensional ground coordinate associated with the captured images in response to the corrected set of orientation parameters.

14 Claims, 21 Drawing Sheets

(51) Int. Cl.

| | |
|---|---|
| *G01C 11/34* | (2006.01) |
| *G01C 21/16* | (2006.01) |
| *G01C 21/20* | (2006.01) |
| *G01S 19/40* | (2010.01) |
| *G01S 19/42* | (2010.01) |
| *G01S 19/48* | (2010.01) |
| *G06T 7/73* | (2017.01) |

(52) U.S. Cl.
CPC ..... *G01C 21/1654* (2020.08); *G01C 21/1656* (2020.08); *G01S 19/40* (2013.01); *G01S 19/42* (2013.01); *G01S 19/485* (2020.05); *G06T 7/74* (2017.01); *G06T 2207/30184* (2013.01); *G06T 2207/30244* (2013.01); *G06T 2207/30252* (2013.01)

(58) Field of Classification Search
CPC .......... G01S 19/42; G01S 19/40; G01S 19/49; G01S 19/485
See application file for complete search history.

(56) References Cited

U.S. PATENT DOCUMENTS

| | | | | |
|---|---|---|---|---|
| 8,483,442 | B2* | 7/2013 | Takiguchi | G06T 7/521 382/106 |
| 8,897,543 | B1* | 11/2014 | Lin | G06T 7/593 382/154 |
| 2005/0013501 | A1* | 1/2005 | Kang | G06T 5/50 382/254 |
| 2007/0242131 | A1* | 10/2007 | Sanz-Pastor | H04L 67/148 455/457 |
| 2008/0152192 | A1* | 6/2008 | Zhu | G06T 7/20 382/103 |
| 2009/0169095 | A1* | 7/2009 | Zhuang | G01B 11/2545 382/154 |
| 2009/0214107 | A1* | 8/2009 | Masuda | G06T 7/593 382/154 |
| 2009/0316951 | A1* | 12/2009 | Soderstrom | G06F 16/9537 382/103 |
| 2010/0017115 | A1* | 1/2010 | Gautama | G01C 15/00 701/533 |
| 2012/0229607 | A1* | 9/2012 | Baker | H04N 13/221 348/46 |
| 2013/0099977 | A1* | 4/2013 | Sheshadri | H04W 4/022 342/450 |
| 2013/0147923 | A1* | 6/2013 | Zhou | H04N 7/15 348/47 |
| 2013/0236107 | A1* | 9/2013 | Fukaya | G06T 7/246 382/201 |
| 2013/0250047 | A1* | 9/2013 | Hollinger | H04N 23/662 348/36 |
| 2013/0272581 | A1* | 10/2013 | Moden | G06T 7/70 382/106 |
| 2014/0064126 | A1* | 3/2014 | Lim | G01S 5/0257 370/252 |
| 2014/0107919 | A1* | 4/2014 | Venkatraman | G01C 21/3889 701/466 |
| 2014/0172361 | A1* | 6/2014 | Chiang | G01C 22/006 702/160 |

OTHER PUBLICATIONS

Lourakis et al. ("SBA: A software package for generic sparse bundle adjustment," ACM Trans. Math. Software, 2009).*
El-Sheimy ("The Development of Vista—A Mobile Survey System for GIS Applications," Ph.D. Dissertation, The University of Calgary, 1996) (Year: 1996).*
Lourakis et al. ("SBA: A software package for generic sparse bundle adjustment," ACM Trans. Math. Software, 2009) (Year: 2009).*
Almazan et al. ("Full auto-calibration of a smartphone on board a vehicle using IMU and GPS embedded sensors," IEEE Intelligent Vehicles Symposium (IV), Jun. 23-26, 2013) (Year: 2013).*
Shangguan et al. ("Towards Accurate Object Localization with Smartphones," IEEE Transactions on Parallel and Distributed Systems, vol. 25, Issue: 10; Date of Publication: Sep. 17, 2013) (Year: 2013).*
Liu et al. ("A camera self-calibration method based on dual constraints of multi-view images," International Conference on Wireless Communications and Signal Processing; Date of Conference: Nov. 9-11, 2011) (Year: 2011).*
Dang et al. ("Continuous Stereo Self-Calibration by Camera Parameter Tracking," IEEE Transactions on Image Processing, vol. 18, Issue: 7, Jul. 2009) (Year: 2009).*
Jang et al. ("Self-Calibration of a Stereo-Camera by Pure Translational Motion," Proceedings of 3rd IEEE International Conference on Image Processing; Date of Conference: Sep. 1996) (Year: 1996).*
Luong et al. ("Self-calibration of a camera using multiple images," Proceedings. 11th IAPR International Conference on Pattern Recognition; Aug. 30-Sep. 3, 1992) (Year: 1992).*

* cited by examiner

MOBILE MAPPING SYSTEM

CROSS-REFERENCE TO RELATED APPLICATIONS

This non-provisional patent application claims priority to U.S. Provisional Pat. App. No. 62/014,984 Filed on Jun. 20, 2014, which is entitled "Smartphone-Based Mobile Mapping System," which is incorporated herein in its entirety.

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

TECHNICAL FIELD

Embodiments of the invention are directed, in general, to geoinformatics and, more specifically, to mobile mapping systems and methods.

BACKGROUND

In recent years, there has been explosive growth in the demand for geo-spatial data. This demand has numerous sources and takes many forms; however, the net effect is an ever-increasing thirst for data that is more accurate, has higher density, is produced more rapidly, and is acquired less expensively. For mapping and Geographic Information Systems (GIS) projects, this has been achieved through the major development of Mobile Mapping Systems (MMS). MMS integrate various navigation and remote sensing technologies which allow mapping from moving platforms (e.g. cars, airplanes, boats, etc.) to obtain the 3D coordinates of the points of interest. Such systems obtain accuracies that are suitable for all but the most demanding mapping and engineering applications. However, this accuracy doesn't come cheaply. Today's mobile devices are getting ever more sophisticated. Phone makers are determined to reduce the gap between computers and mobile phones. Mobile devices, in addition to becoming status symbols, are increasingly being equipped with extended Global Positioning System (GPS) capabilities, Micro Electro Mechanical System (MEMS) inertial sensors, extremely powerful computing power and very high resolution cameras. Using all of these components, mobile devices have the potential to replace the traditional land MMS and portable GPS/GIS equipment.

One motivation for using a MMS is its ability to provide accurate, fast and economic mapping solution. This solution increases the efficiency of spatial data collection for different GIS applications such as mapping of roads, railways, utilities and infrastructures. Because of their high cost, the market for such land-based MMS is rather small, and such systems are typically "one-off" systems that are operated by the companies or institutions that build them. In effect, this means that while several companies are making a profit using MMS, few are making a profit manufacturing them. This also means that the benefits of mobile mapping—in particular the lower costs and greater efficiency of data collection—are not being enjoyed.

SUMMARY

Embodiments of systems and methods for a mobile mapping system are described. In an embodiment, a method includes capturing a plurality of images of an object point using a mobile computing platform. The method may also include determining an initial set of orientation parameters in response to one or more orientation sensors on the mobile computing platform. Additionally, the method may include calculating a corrected set of orientation parameters by matching object points in the plurality of images. Further, the method may include estimating a three-dimensional ground coordinate associated with the captured images in response to the corrected set of orientation parameters.

In an further embodiment, the set of orientation parameters comprise External Orientation Parameters (EOPs). The EOPs may be determined using an onboard Global Positioning Satellite (GPS) system. In another embodiment, the EOPs are determined using an onboard accelerometer and magnetometer. In one embodiment, the set of orientation parameters comprise Internal Orientation Parameters (IOPs).

The method may also include detecting and removing blunders in the matched object points. In one embodiment, estimating the three-dimensional ground coordinate is calculated using a bundle adjustment algorithm.

Embodiments of an MMS are also described, wherein the MMS is implemented in a mobile device, such as a smartphone. The mobile device may be configured to capture a plurality of images of an object point using a mobile computing platform, determine an initial set of orientation parameters in response to one or more orientation sensors on the mobile computing platform, calculate a corrected set of orientation parameters by matching object points in the plurality of images, and estimate a three-dimensional ground coordinate associated with the captured images in response to the corrected set of orientation parameters.

BRIEF DESCRIPTION OF THE DRAWINGS

Figure 1:
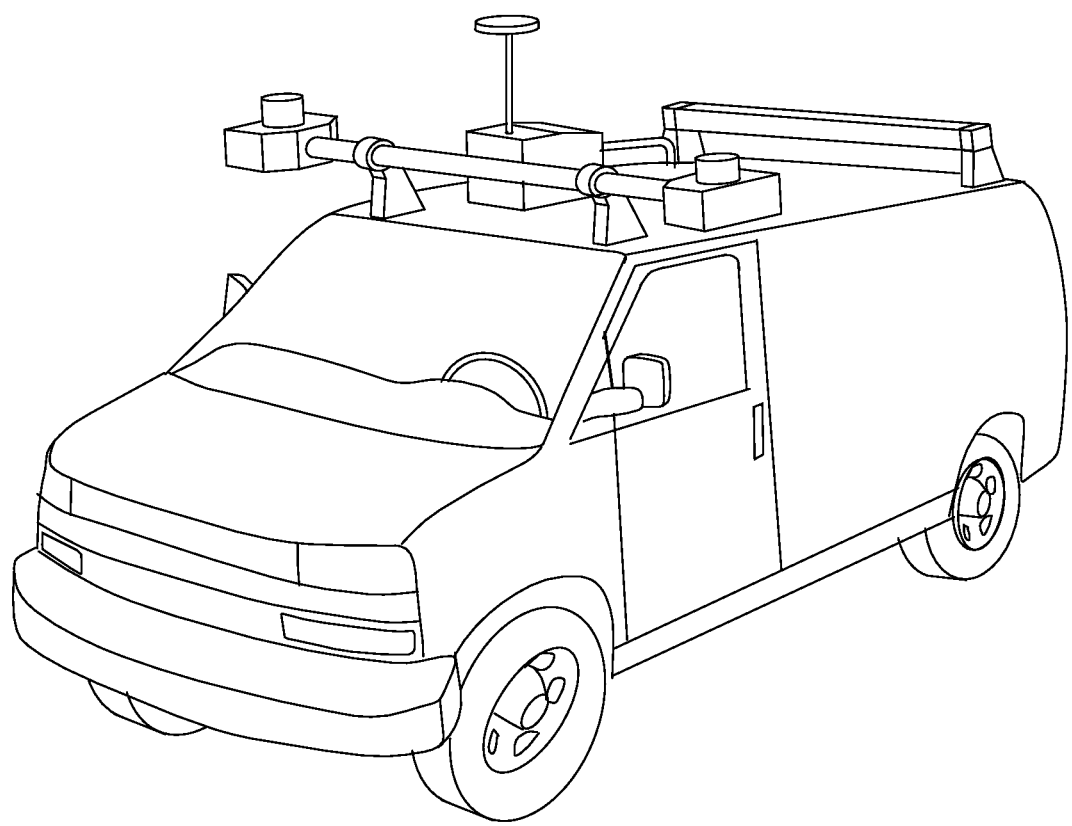

Having thus described the invention in general terms, reference will now be made to the accompanying drawings, which are not necessarily drawn to scale, and wherein:

FIG. 1 illustrates one embodiment of a VISAT System.

Figure 2:
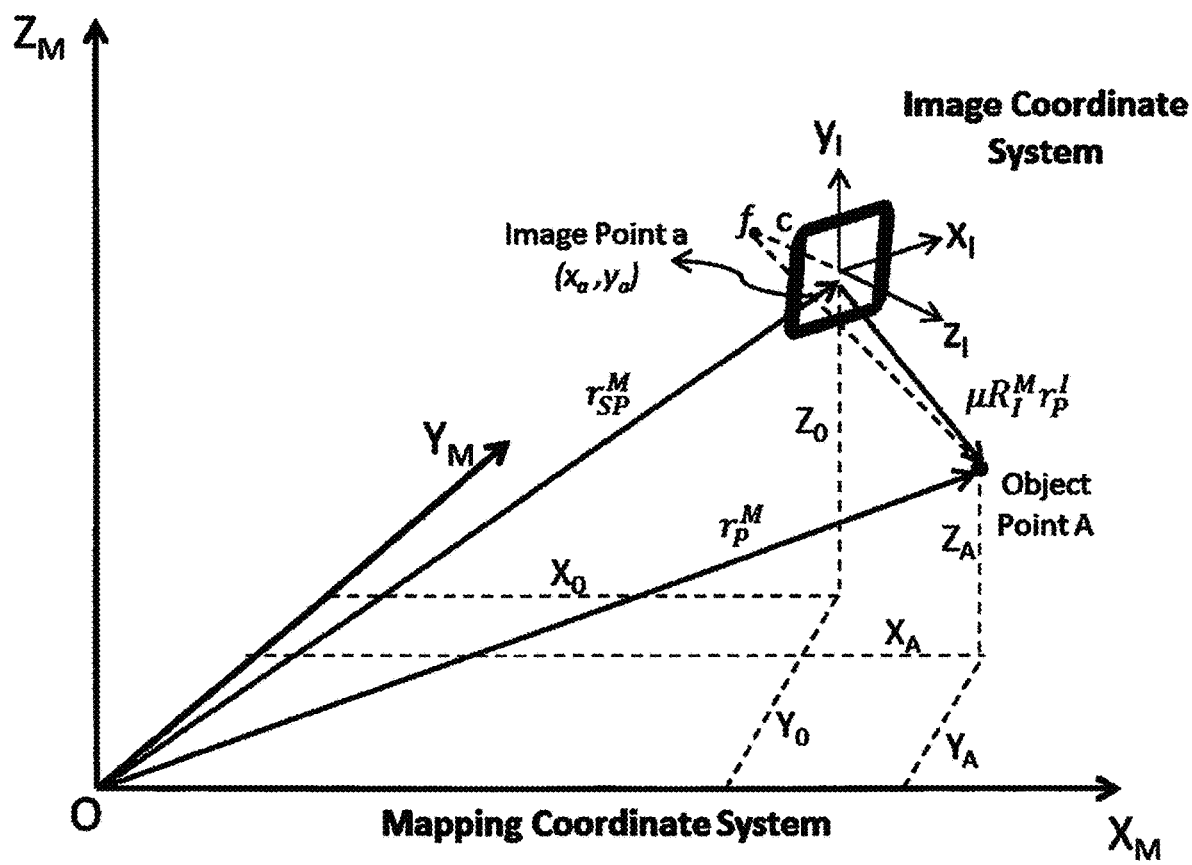

FIG. 2 illustrates an embodiment of mapping and mobile coordinate systems.

Figure 3:
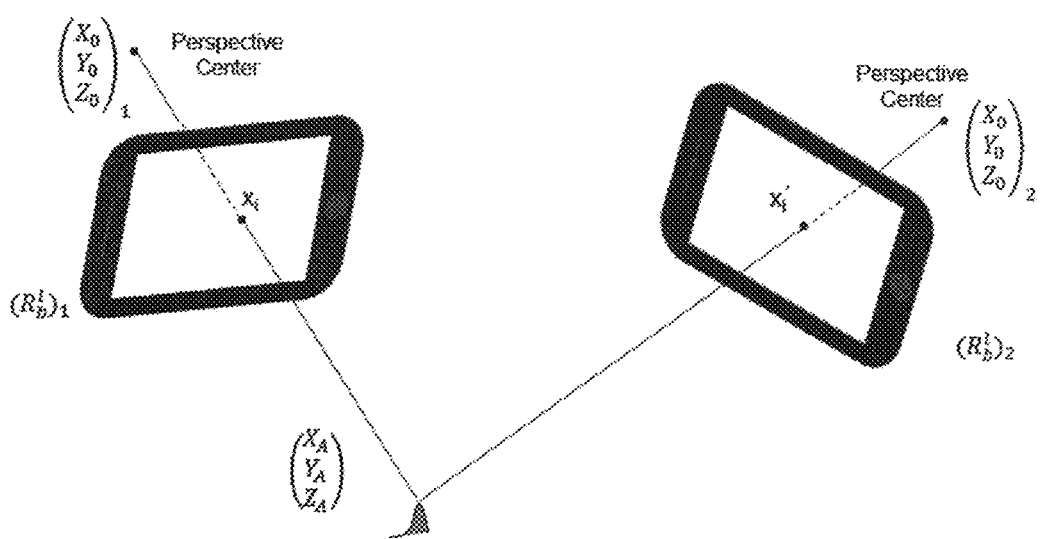

FIG. 3 illustrates an embodiment of direct georeferencing.

Figure 4:
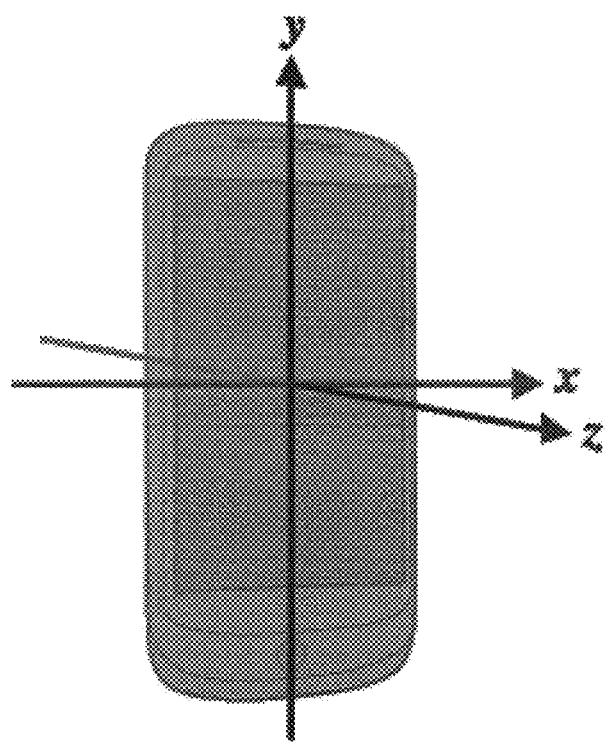

FIG. 4 illustrates an embodiment of axes definitions for a mobile device.

Figure 5:
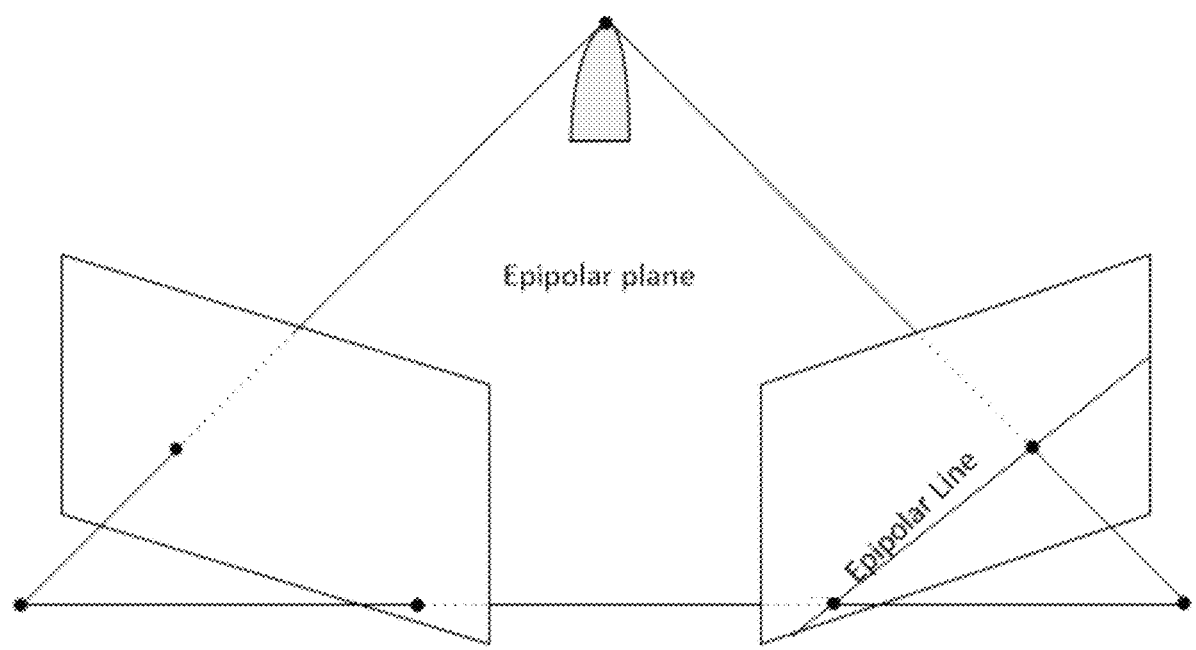

FIG. 5 illustrates an embodiment of Epipolar Geometry.

Figure 6:
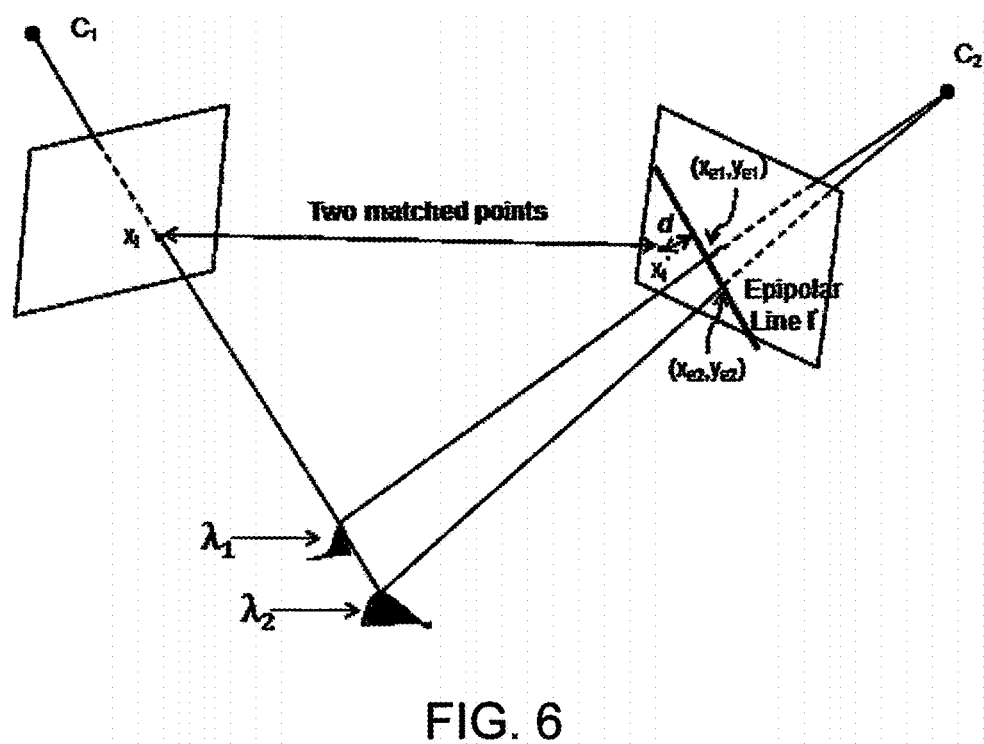

FIG. 6 illustrates an embodiment of EOPs Correction.

Figure 7:
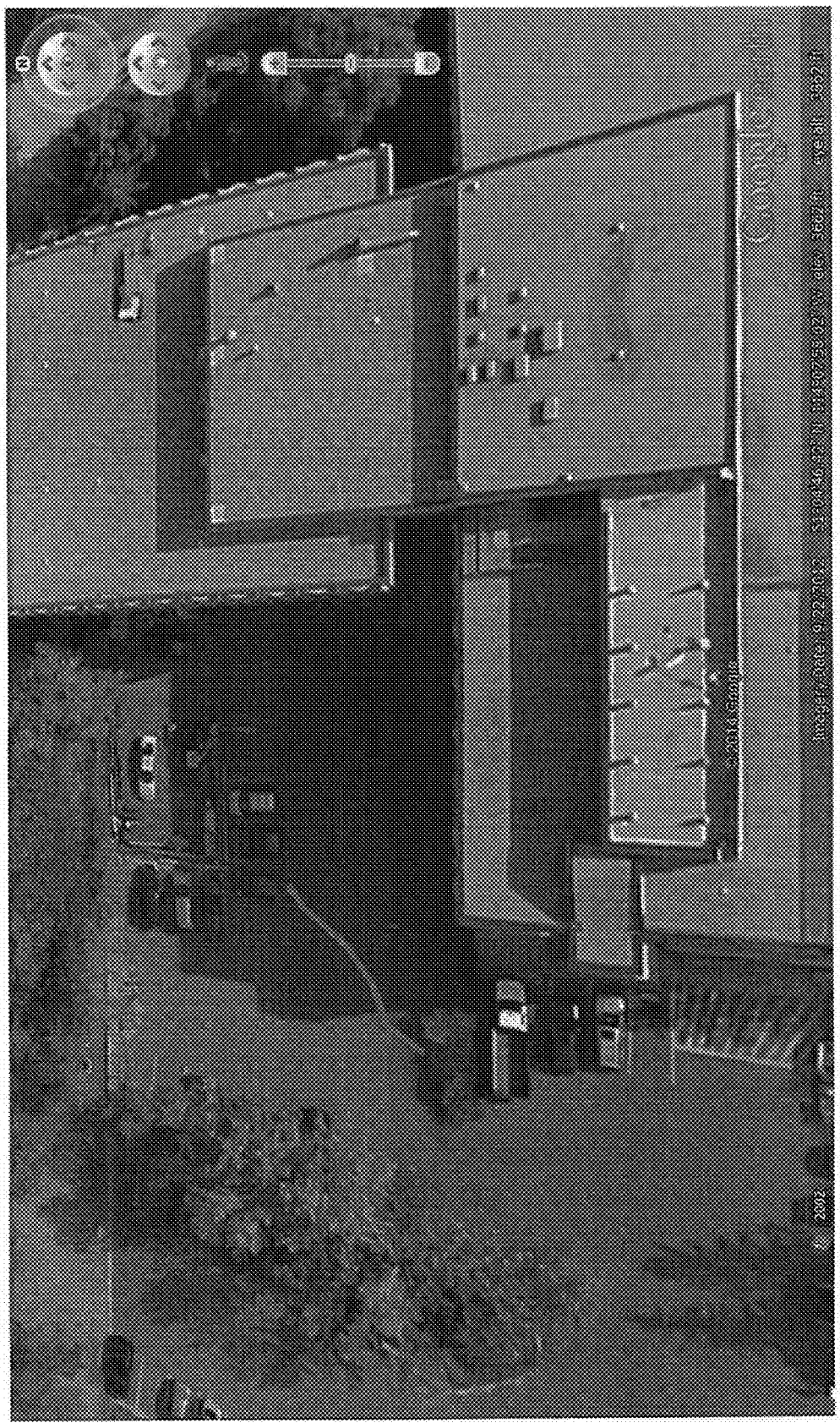

FIG. 7 illustrates an embodiment of locations of the captured images

Figure 8:
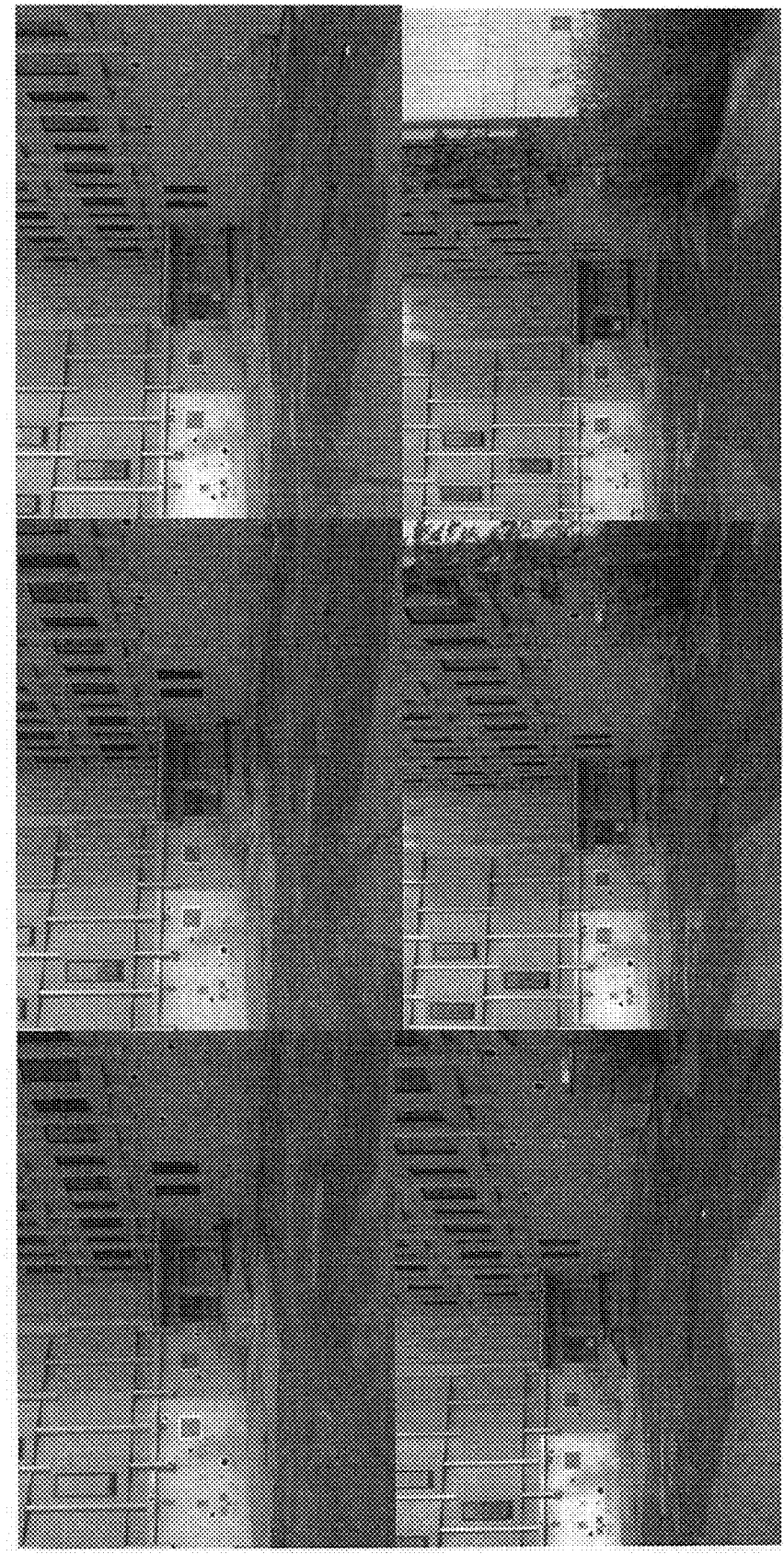

FIG. 8 illustrates an embodiment of captured images.

Figure 9:
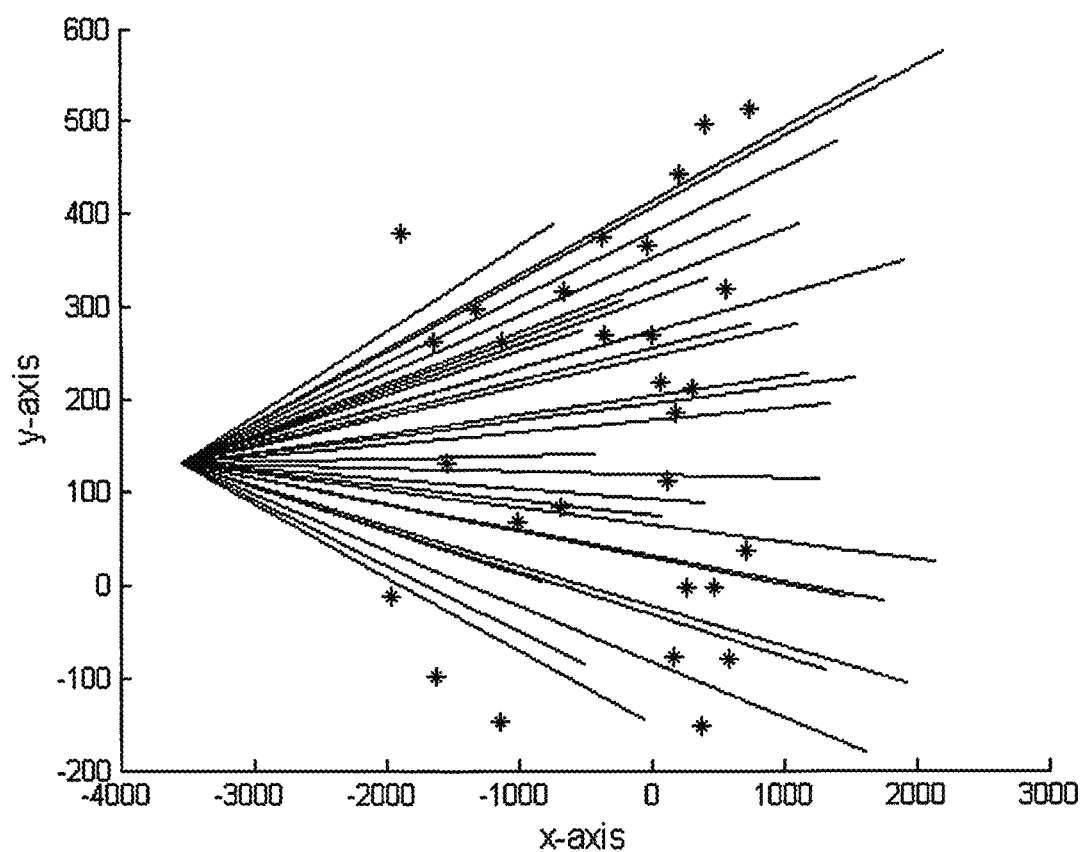

FIG. 9 illustrates an embodiment of an image plane using initial EOPs

Figure 10:
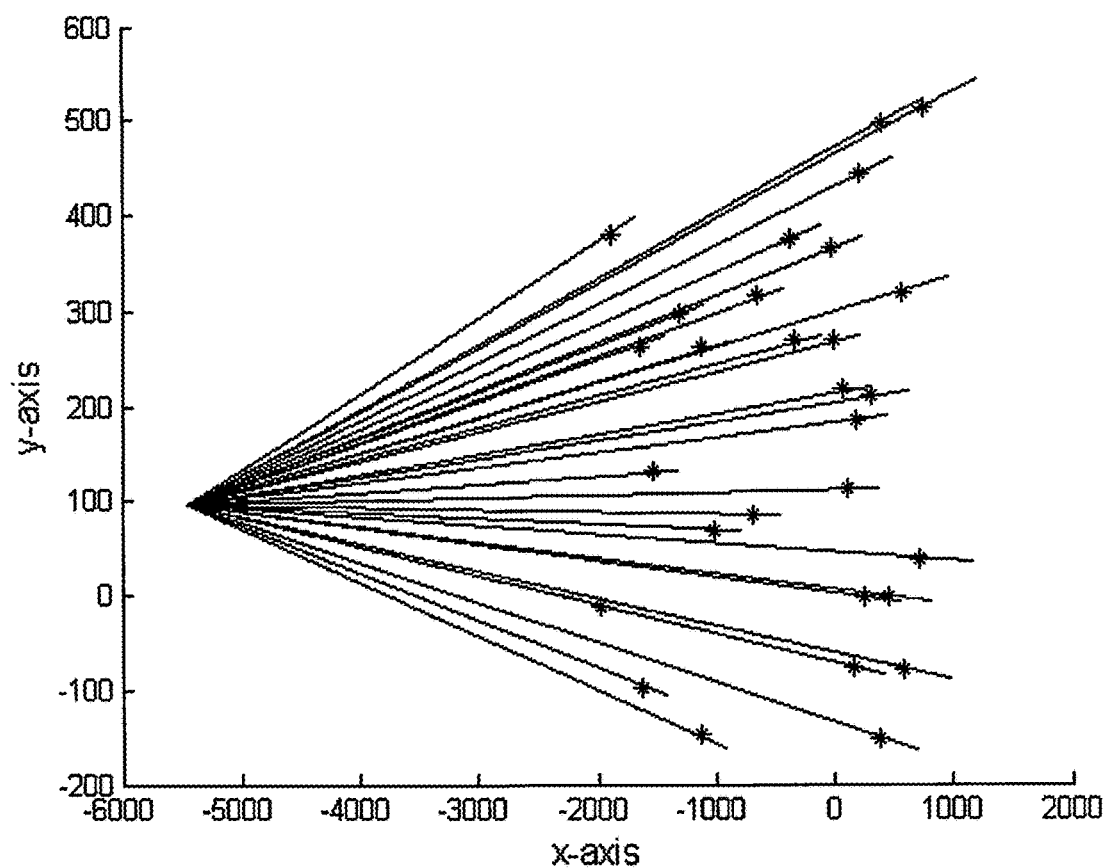

FIG. 10 illustrates an embodiment of an image plane using corrected EOPs

Figure 11:
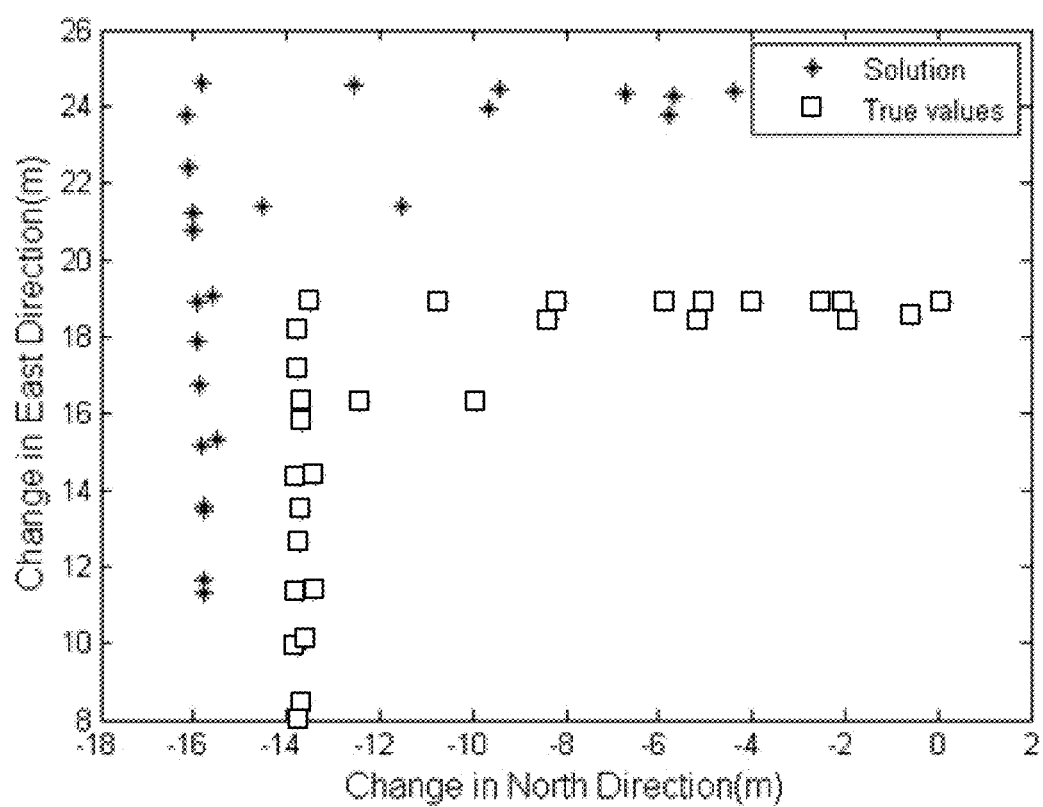

FIG. 11 illustrates an embodiment of a mapping solution without using control points.

Figure 12:
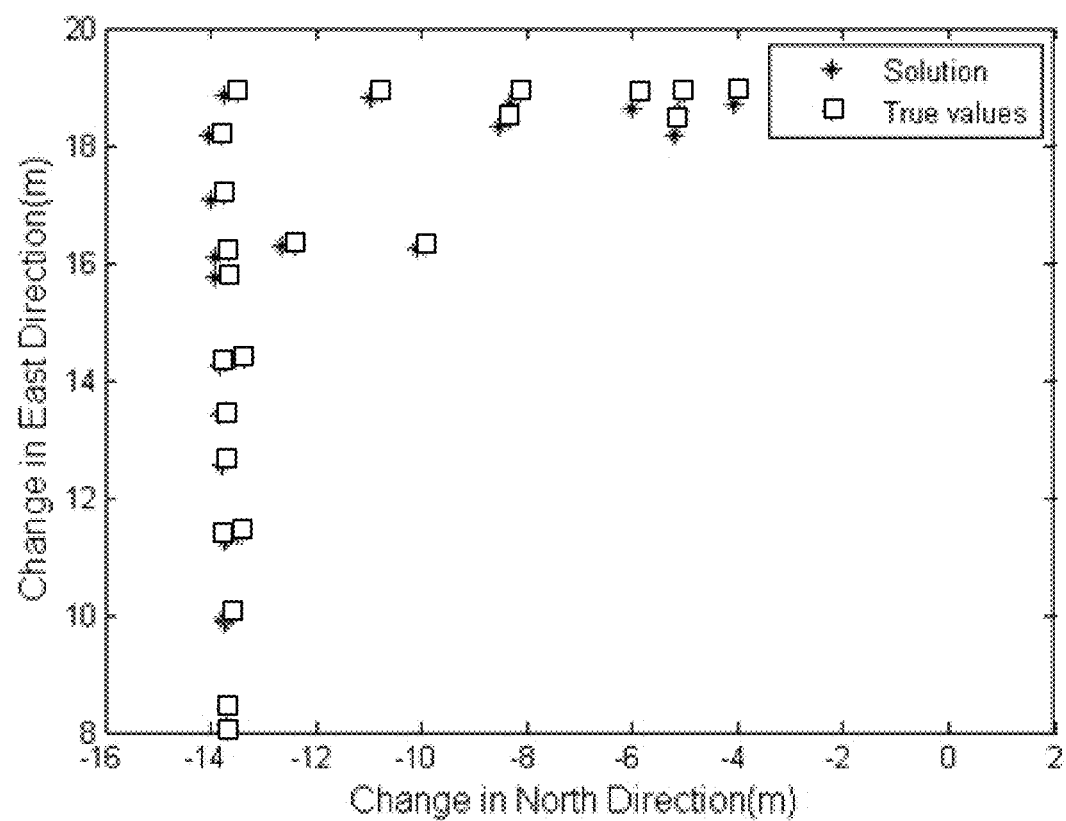

FIG. 12 illustrates an embodiment of a mapping solution using two control points.

Figure 13:
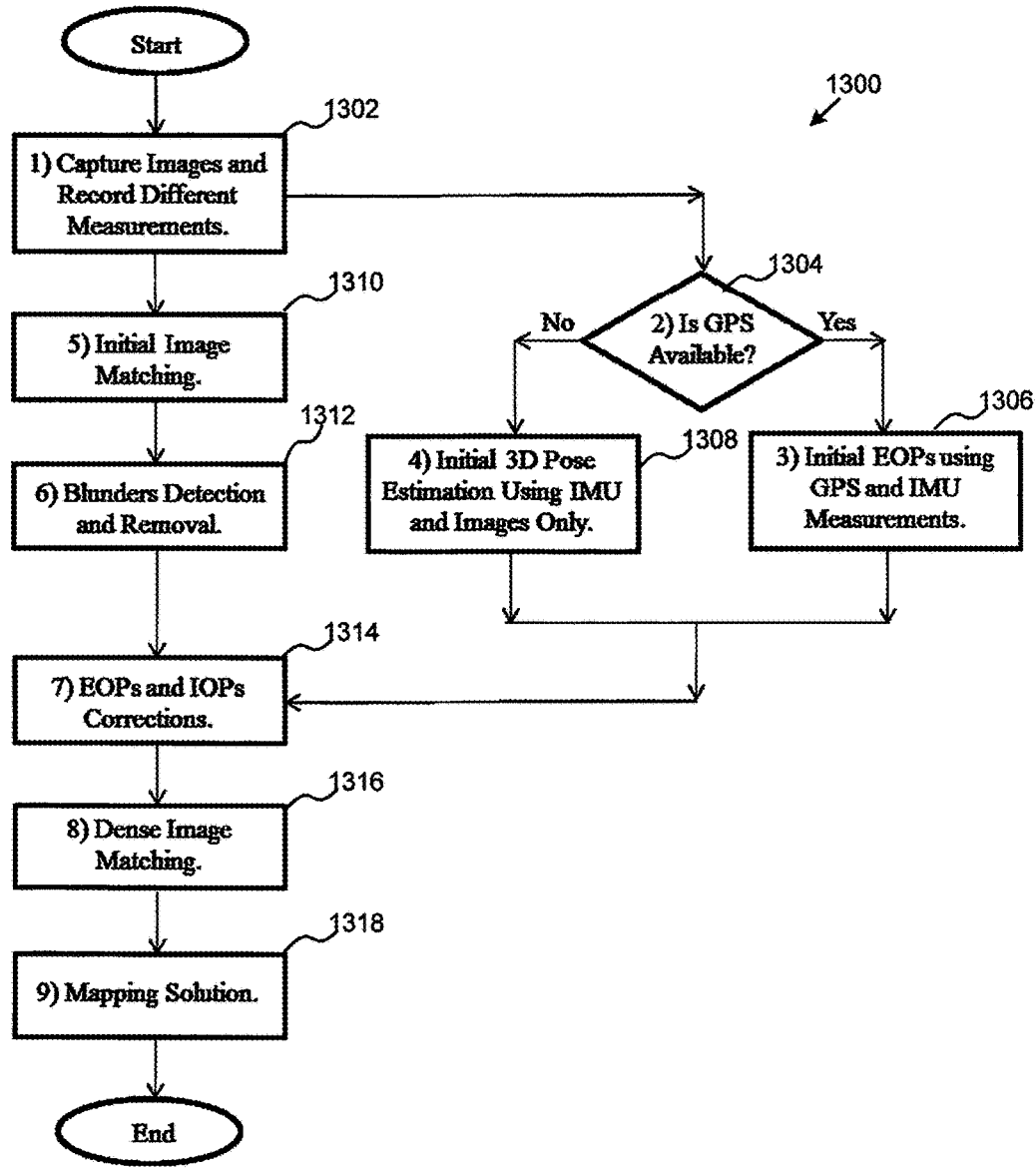

FIG. 13 illustrates an embodiment of a flowchart of a method for mobile mapping.

Figure 14:
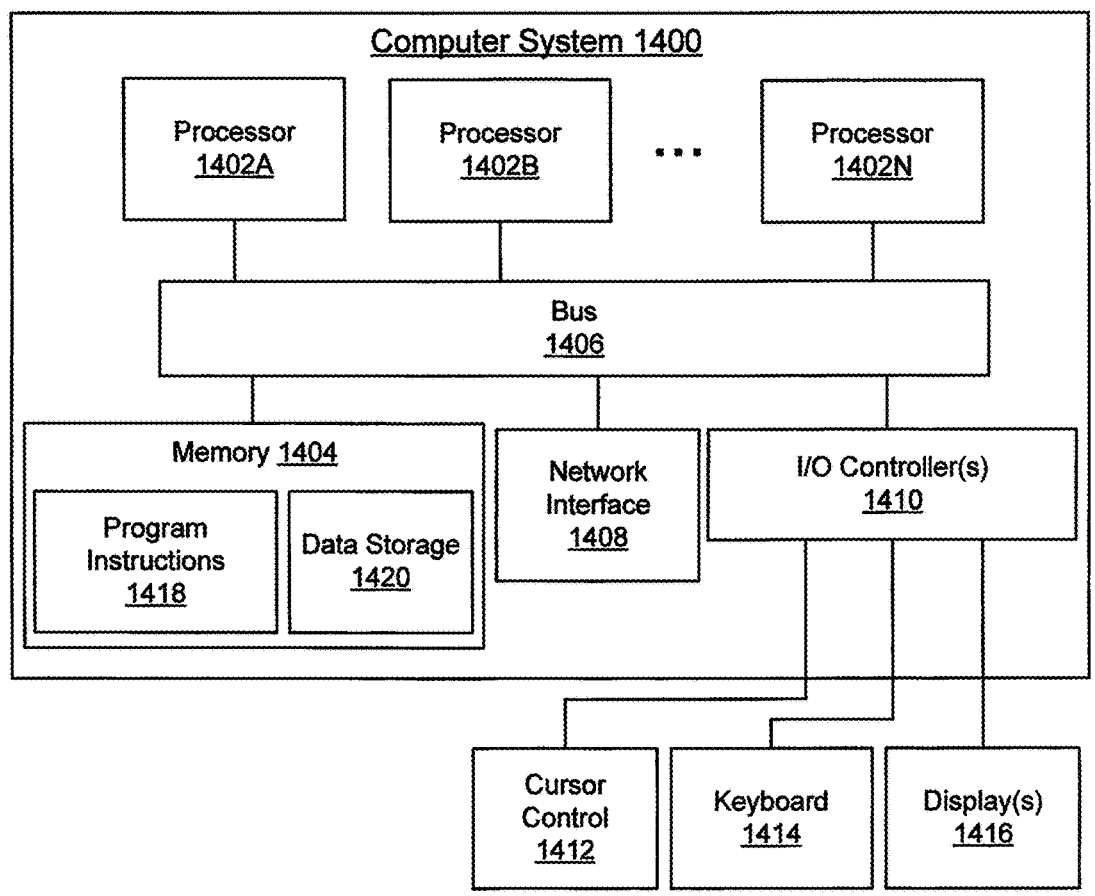

FIG. 14 is a schematic block diagram illustrating one embodiment of a computer system for mobile mapping systems.

Figure 15:

FIG. 15 is a diagram illustrating a building to be modelled.

Figure 16:
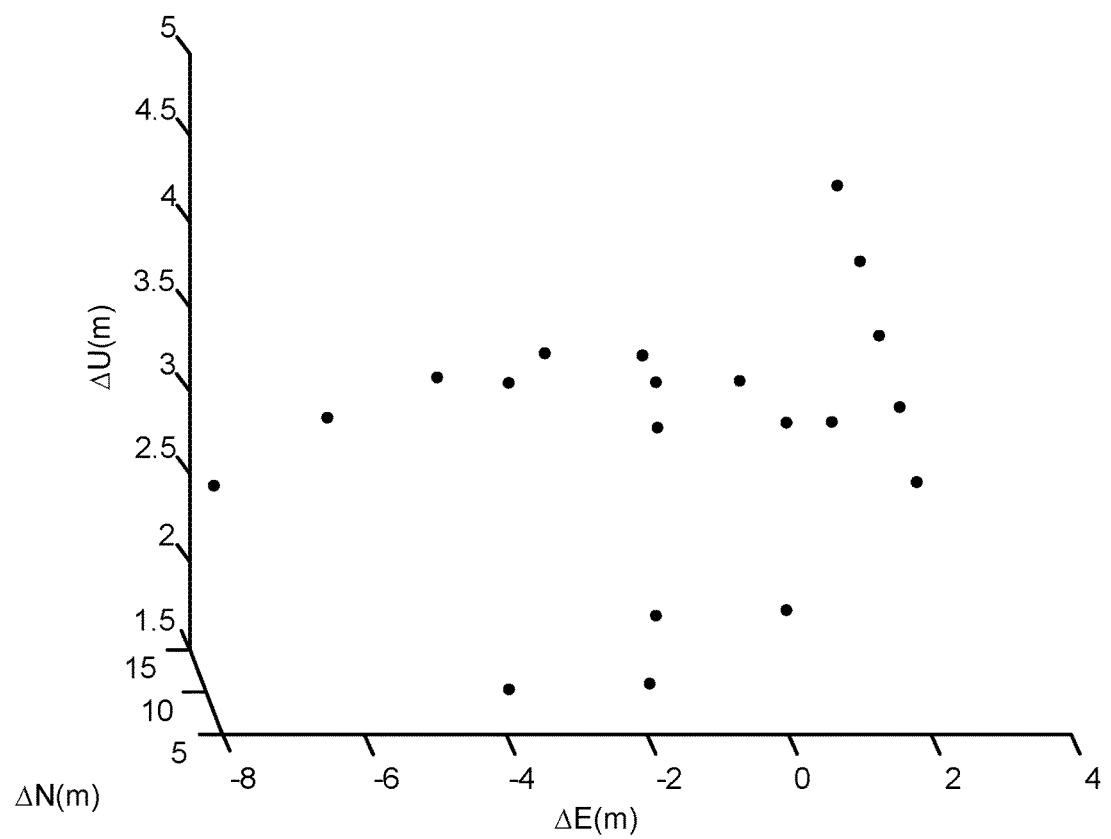

FIG. 16 is a diagram illustrating a mapping solution for modelling application.

Figure 17:
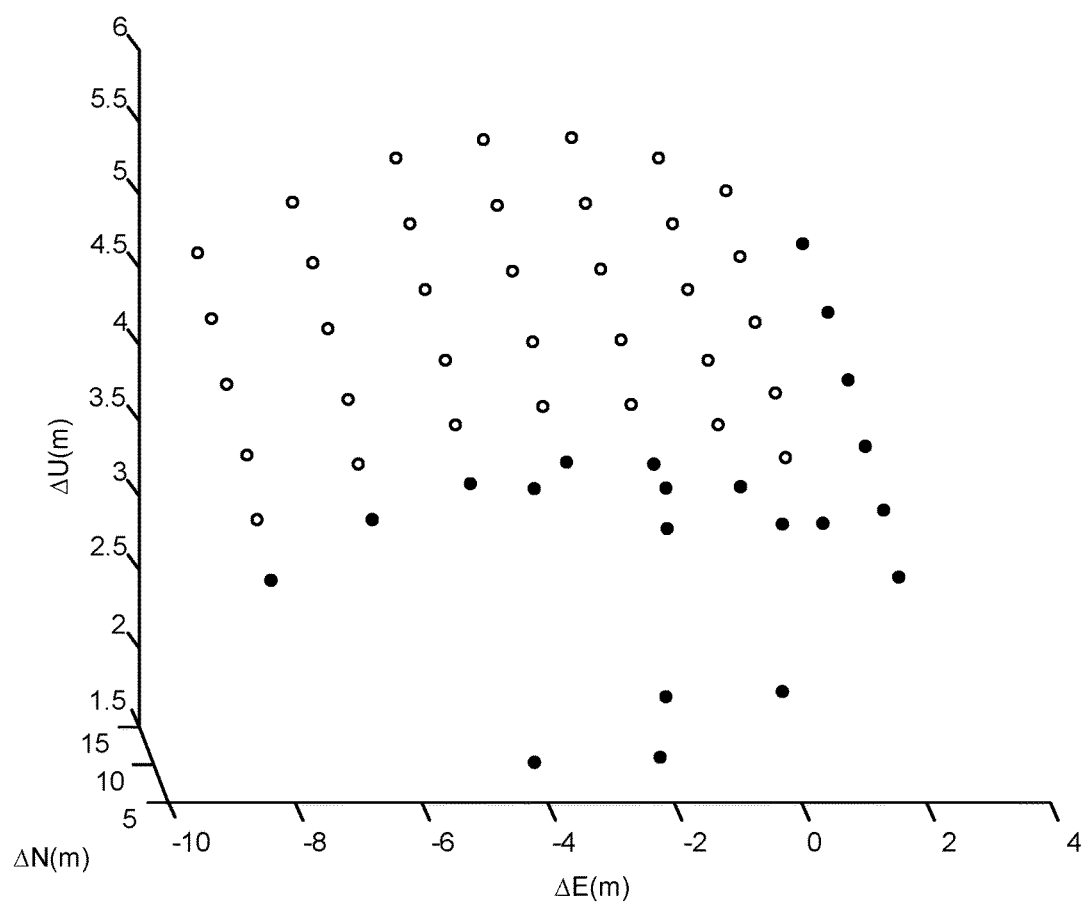

FIG. 17 is a diagram illustrating a grid model of the mapped building.

Figure 18:
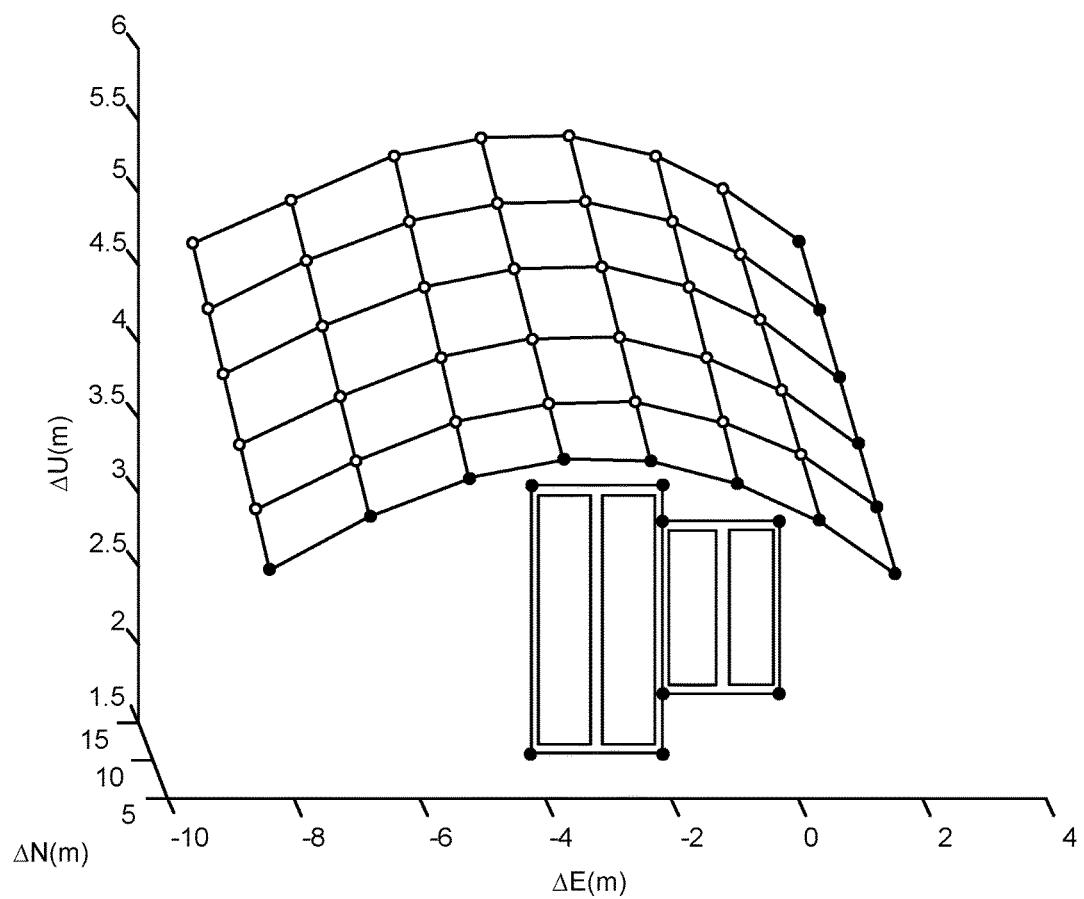

FIG. 18 is a diagram illustrating a first modelling solution.

Figure 19:
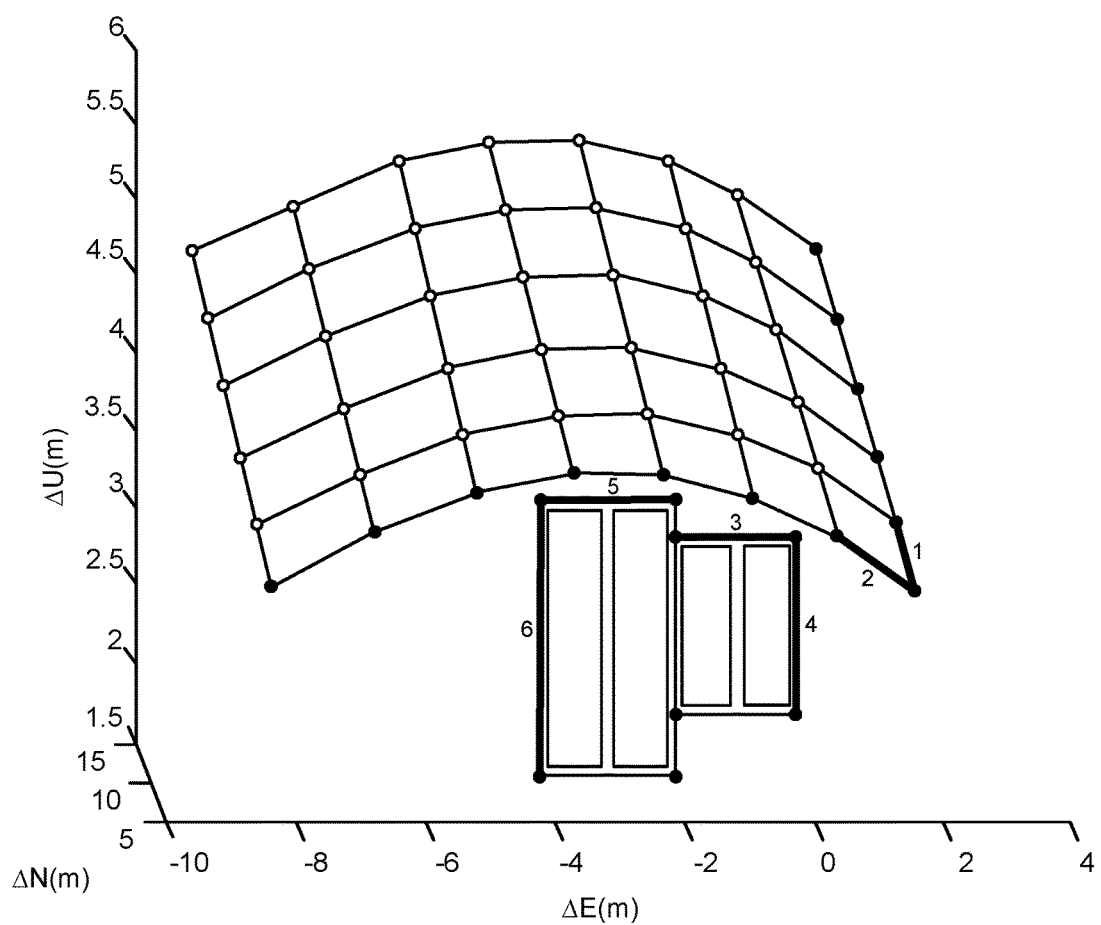

FIG. 19 is a diagram illustrating a second modelling solution.

Figure 20:

FIG. 20 is a diagram illustrating locations of the captured images for lengths measurement application.

Figure 21:
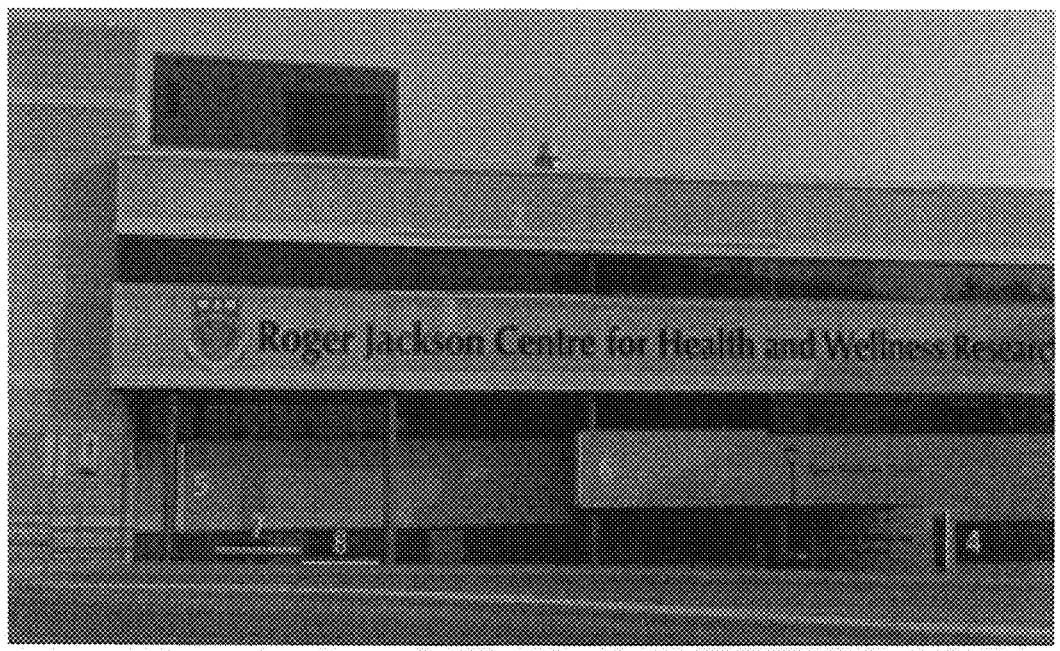

FIG. 21 is a diagram illustrating measured edges.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

Embodiments of systems and methods for a mobile mapping system are described. In an embodiment, the obtained matched images from the phone are used as an update source to remove the accumulated errors of the obtained EOPs from the IMU and GPS receiver. Using a set of matched points between images and the epipolar geometry constraints, a new proposed method is implemented to refine the erroneous initial EOPs. Using the new solved EOPs, captured images can be directly georeferenced and bundle adjustment software can be used to calculate the 3D coordinates of the interest points.

Beneficially, the described embodiments provide a very low cost mobile mapping system with reasonable accuracy using the existing motion, navigation, and imaging sensors in mobile devices. Various photogrammetric principles may be used in the proposed system. Accordingly, mobile devices may provide a valuable source for geospatial data.

Using a mobile device as a mobile mapping platform, the cost and the synchronization problems associated with previous MMSs are resolved, because all the required components for mapping are integrated in one platform, where a common clock can be used to synchronize all the data without any additional setup.

Today's mobile devices enable normal users around the world to make voice and video calls, send messages and e-mails, capture images and many other applications. eMarketer estimates there are 1.75 billion mobile device users in 2014 around the world which means that there is an approximately one in every five people in the world owns a smartphone (eMarkter, 2014). Nowadays, most of the mobile devices contain both accelerometers and gyroscopes which are required for different applications and games. Yole development estimates there are 497M units of smartphones with accelerometers and gyroscopes (Yole Development, 2012).

One feature of mobile devices is their ability to determine the location of their users using low cost GPS receiver and different motion sensors. Mobile devices are considered the most widespread platform that equipped with a low cost GPS receiver, which can provide the position of the user within few meters accuracy in Line of Site (LOS) environments, and indoor using low cost MEMS based IMU which contains three accelerometers and three gyroscopes. In addition, recent mobile devices also include three magnetometers, one barometer and high resolution digital cameras. The potential of these sensors, which are useful for mobile mapping, in one platform motivates researchers around the world to develop new algorithms and applications for mobile phones outside the traditional voice calls, SMS etc. As an example, low cost MEMS based motion sensors have played a crucial role in developing low cost commercial navigation applications for indoor and poor-GPS environments for pedestrian navigation.

The main challenge, however, of using mobile devices for mapping applications is their sensors' errors which deteriorate the accuracy of the obtained position and orientation solutions of the mobile devices. In photogrammetry, these parameters are called EOPs. These erroneous EOPs can't be used for different mapping applications without absolute update source.

The development of the MMS has seen a progression of phases. Photo logging systems were originally used to monitor roads for maintenance purposes (pavements, signs, etc.). However, photo logging systems did not have the ability to calculate the 3D object coordinates. Mobile mapping technology has witnessed a rapid development during the past 20 years. MMS composed of two main types of sensors; navigation and imaging (mapping) sensors. Navigation sensors, such as Inertial Measurement Units (IMUs) and GPS receivers, are used to determine the position and the orientation of the mapping sensors. On the other hand, passive imaging sensors such as digital cameras or active imaging sensors such as laser scanners can be used as mapping sensors. In addition to the 3D mapping capabilities, MMS offers the ability to directly georeference their mapping sensors, which means knowing their External Orientation Parameters (EOPs) at exposure times without the need for any control points.

After data acquisition of the georeferenced images and spatial information, information extraction and management can be done. To determine the 3D coordinate of any object of interest, at least two conjugate images are needed for this object. Objects of interest can be edges, surfaces, roads centrelines, traffic signs, etc. More images for the same object mean more accurate solution. Information extraction can be done using different automatic extraction techniques.

One of the first operational land-based MMS is the VISAT system, shown in FIG. 1, which has been developed by the department of Geomatics engineering at University of Calgary. In the VISAT system, a 0.3 meter absolute position accuracy and 0.1 meter relative accuracy has been obtained using a dual frequency carrier phase differential GPS, eight digital cameras and a navigation grade IMU, which has been used to improve the accuracy of the mapping solution during GPS signal outages. The main objective for the VISAT project was to develop an accurate MMS for road and GIS data acquisition at a normal highway vehicle speed (e.g., 100 km/hr).

In general, the assessment of any mobile mapping system is performed using factors such as accuracy, cost, portability, power consumption and others. The final accuracy of the system is a function of the complete processing chain which involves GPS positions, INS position/attitude, target localization in the images, and system calibration.

Another MMS example is a backpack mobile mapping system to obtain a low cost and complexity, small size and accurate MMS without using any ground control points. In addition to a Novatel GPS receiver, the backpack system used the Leica digital compass and Kodak consumer digital camera. Custom software was also developed for this system. The obtained relative accuracy was about 5 cm while the absolute accuracy was 0.2 m in horizontal direction and 0.3 m in vertical direction.

Additionally, a mobile mapping system has been developed for indoor 3D mapping and positioning where 8 CCD cameras, dead reckoning system and a range sensor have been used for this purpose. For road mapping and features localization applications, many mapping systems have been developed in the last two decades.

In addition to the high cost of all current MMS, time synchronization between the different sensors of the MMS is another challenge.

Georeferencing video images can be defined as the problem of transforming the 3-D coordinate vector the image frame to the mapping frame (m-frame) in which the results are required. Using the GPS and IMU measurements to compute the position and the rotation of the mobile device in mapping frame, the 3D coordinates of interest points can be calculated using equation (1). FIG. 2 illustrates the described coordinate system.

$$r_P^M = r_{SP}^M + \mu R_I^M r_P^I \quad (1)$$

Where $r_P^M$ and $r_{SP}^M$ are the object point and mobile device position vectors in the mapping frame, $r_P^I$ is the position vector of point p in the image frame (I), $\mu$ and $R_M^I$ are the scale factor and the rotation matrix between the mapping and the image coordinate systems. The lever arm between the image plane and the mobile device is ignored since it is small compared to the error in the GPS receiver measurements of the mobile device.

The relationship between image and mapping (ground) coordinate systems is usually described using the collinearity equations where the image point, object point and the perspective centre of the camera are collinear. FIG. 2 shows the coordinate systems used in this research work; mobile device and mapping coordinate systems.

As can be noticed from FIG. 2, both vectors $\vec{fA}$ and $\vec{fa}$ are collinear and therefore:

$$\vec{fa} = \mu R_M^I \vec{fA} \quad (2)$$

Vectors $\vec{fA}$ and $\vec{fa}$ are equal to:

$$\vec{fa} = \begin{bmatrix} x_a - x_p \\ y_a - y_p \\ -c \end{bmatrix} \quad (3)$$

$$\vec{fA} = \begin{bmatrix} X_A - X_0 \\ Y_A - Y_0 \\ Z_A - Z_0 \end{bmatrix} \quad (4)$$

Where:
C=focal length
$x_p$, $y_p$=image coordinates of the principle point.
$x_a$, $y_a$=image coordinates of the object point.
$X_0$, $Y_0$, $Z_0$=perspective centre ground coordinates.
$X_A$, $Y_A$, $Z_A$=object point ground coordinates.

Another aspect that may be considered in the georeferencing is the camera calibration parameters. For many medium accuracy applications, computing the first radial distortion coefficient ($k_1$) is usually sufficient. Both the higher radial distortion coefficients and the decentric distortion parameters can be ignored. After substituting equations (3) and (4) into equation (2) and dividing the result by the focal length c, the result is the two extended collinearity equations (5) and (6) which include the effect of the radial distortion.

$$x_a + \delta x_r = x_p - c \frac{r_{11}(X_A - X_0) + r_{12}(Y_A - Y_0) + r_{13}(Z_A - Z_0)}{r_{31}(X_A - X_0) + r_{32}(Y_A - Y_0) + r_{33}(Z_A - Z_0)} \quad (5)$$

$$y_a + \delta y_r = y_p - c \frac{r_{21}(X_A - X_0) + r_{22}(Y_A - Y_0) + r_{23}(Z_A - Z_0)}{r_{31}(X_A - X_0) + r_{32}(Y_A - Y_0) + r_{33}(Z_A - Z_0)} \quad (6)$$

Where $r_{ij}$ is the $i^{th}$ row and $j^{th}$ column element of the rotation matrix $R_M^I$, $\delta x_r$ and $\delta y_r$ are the effect of the radial distortion in the x and y directions of the image. Using two or more images and collinearity equations, the 3D coordinates of interest points in mapping frame can be calculated as shown in FIG. 3.

The present embodiments may be implemented on a smartphone, for example a Samsung Galaxy S4 smartphone may be used as the MMS platform. The Samsung Galaxy S4 contains a high resolution 13 MP digital camera and accurate motion sensors. The types of the Global Navigation Satellite System (GNSS) receiver and different motion sensors inside S4 smartphone are listed in Table 1. The axes definitions of S4 device is shown in FIG. 4.

TABLE 1

Types of GNSS receivers and motion sensors available with Samsung Galaxy S4.

| | Type |
|---|---|
| GNSS | Broadcom BCM47521 |
| Accelerometers | STMicroelectronics LSM330DLC |
| Gyroscopes | STMicroelectronics LSM330DLC |
| Magnetometers | AsahiKasei AK8963 |

Bundle adjustment is a non-linear least square estimation where initial values for the unknown vector are very important to obtain a converged solution. Bad initial values may lead to a divergence of the final solution. In an embodiment, ideal IOPs parameters values are used as initials values. On the other hand, the measurements of the GPS, accelerometers and magnetometers are used to initialize the EOPs of each image. Latitude, longitude and height measurements of the GPS receiver are used to compute the initial values of the camera shifts in the north, east and up directions between each two consecutive images as shown in equations (7), (8) and (9).

$$\Delta N = \Delta \Phi (R_{earth} + H_1) \quad (7)$$

$$\Delta E = \Delta \lambda (R_{earth} + H_1) \cos(\phi) \quad (8)$$

$$\Delta U = H_1 - H_2 \quad (9)$$

Where:
$\Delta N$, $\Delta E$, $\Delta U$=the changes in the north, east and up directions.
$\phi$, $\lambda$, H=the latitude, longitude and height GPS measurements.
$R_{earth}$=the radius of the earth at a given latitude.

The initial rotation values of the smartphone at exposure times can be calculated using the measurements of the accelerometers and magnetometers as shown in equations (10), (11) and (12) where roll and pitch angles are the rotation angles around the y and x axes of the mobile device and Azimuth is the deviation angle of the leveled mobile device from the north direction.

$$roll_{initial} = \sin^{-1}\left(\frac{a_x}{g}\right) \quad (10)$$

$$pitch_{initial} = \sin^{-1}\left(\frac{a_y}{g}\right) \quad (11)$$

$$azimuth_{initial} = \tan^{-1}\left(\frac{mag_y}{mag_x}\right) \quad (12)$$

Where:
g=gravity acceleration value.
$a_x$, $a_y$=accelerometers measurements in the x and y axes.
magx, magy=magnetometers measurements.

Without knowing the scale factor λ between the image and the ground coordinate systems, a point in any image can be any point on a line on the other image. This line is known as an epipolar line and the whole geometry behind it is called epipolar geometry as shown in FIG. 5. The epipolar plane consists of the object point and the camera perspective centres of the two images. The epipole is the image of the camera perspective centre of one image on the second image. All the epipolar lines intersect at the epipole.

Using MEMS based IMU and low cost GPS receiver inside mobile devices, good initial values for the EOPs of each image can be obtained. However, these initial values may not be accurate enough to be used as an input for the bundle adjustment mapping software. The present embodiments may include a method to correct the initial values for the IOPs and EOPs of the images. FIG. 6 shows an embodiment of the method, which uses a set of matched points only for correction. In FIG. 6, $x_I$ and $x_I'$ are two image matched points for the same object. $c_1$ and $c_2$ are the perspective centres of the camera in the two images. In the left image, the object point for the matched image point $x_I$ can be any point along the line that connects $c_1$ and $x_I$ points. Using any two scale factors $\lambda_1$ and $\lambda_2$, two object points can be found for $x_I$ image point in the left image. The projections of these two object points on the right image ($x_{e1}$, $y_{e1}$) and ($x_{e2}$, $y_{e2}$) compose an epipolar line l'. The equation of this epipolar line is shown in equation (13).

$$l' = ax + c = \frac{y_{e2} - y_{e1}}{x_{e2} - x_{e1}}(x - x_{e1}) + y_{e1} \quad (13)$$

In some embodiments, the matched point $x_I'$ should belong to the line l'. However, the image point $x_I'$ may be separated from l' by distance d due to the errors in the rotation and the position of the second image. The distance d, which is a function of the EOPs of the images and the IOPs of the camera, can be expressed by the following equation:

$$d = \frac{ax_0 + c + y_0}{\sqrt{a^2 + 1}} \quad (14)$$

Using a set of matched points and the initial values of the IOPs and EOPs, the true EOPs and IOPs can be calculated using non-linear least square estimation technique where the distance d is used as a cost function.

Using the corrected IOPs and EOPs values from the previous step, bundle adjustment software may be used to estimate the 3D ground coordinates solution of the points of interest in the mapping frame (ENU frame). In this bundle adjustment software, the observation vector may be the difference between the measured image matched points and the expected ones using the extended collinearity equations shown in equations (5) and (6).

To test the described embodiments, six images have been captured for a test field with known positions target points. The positions of these images are shown in FIG. 7 and the images themselves are shown in FIG. 8.

FIGS. 9 and 10 show the image plane in the proposed method using initial EOPs values obtained in section 4.2 and the corrected ones after using methods described herein. As can be seen from these figures, the matched points do not belong to their corresponding epipolar lines using the initial EOPs values calculated from the GPS receiver and motion sensors of the mobile device. After correcting the EOPs values, the distances between the matched points and their corresponding epipolar lines are approximately equal to zero as shown in FIG. 10.

After obtaining the corrected EOPs, they are used for mapping using a bundle adjustment software. Mapping results without using any control points are shown in FIG. 10. This mapping solution has a very good relative accuracy. However, mapping solution without using any control points is shifted and scaled due to the errors in the GPS receiver measurements. In addition, this mapping solution might be rotated as well due to the error in the Azimuth angle of the first reference image. Using two control points to shift, scale and rotate the final solution, more accurate absolute results can be obtained as shown in FIG. 11.

FIG. 13 illustrates an embodiment of the described methods. At block 1302, the method 1300 may include capturing synchronized images with IMU and GPS measurements. In an embodiment, capturing may be performed with a mobile application, such as an Android application. At block 1304, the method 1300 includes checking if the GPS measurements are available or not. If GPS measurements are available, the initial camera EOPs at exposure times can be calculated using the GPS, IMU and magnetometers measurements as shown at block 1306. If the GPS measurements are not available, initial camera rotations and relative changes in positions at exposure times will be calculated using IMU, Magnetometers and images. One of the existed camera pose estimation methods in literature will be used for this purpose as shown at block 1308.

In an embodiment, the method 1300 may also include initially matching images using an image matching algorithm as shown at block 1310. In an embodiment, this matching is to find a set of trusted matched points between each two consecutive images. These matched points will be used to find the corrected EOPs and IOPs using their initial values. The blunders in the initial matched points may be detected and removed using RANSAC (RANdom Sample Consensus) as shown at block 1312.

At block 1314, the initial values of the IOPs of the camera and the EOPs of the images which are calculated in steps 1306 and 1308 may be corrected using the matched points found at block 1310 and the epipolar geometry of the images. At block 1316, dense image matching may be performed. The corrected EOPs and IOPs calculated in block 1314 may be used to fast up the speed of matching. In addition, these corrected EOPs and IOPs will be used to detect blunders in these matched points where the matched point in one image should belong to the epipolar line resulted from the matched point in the second image.

At block 1318, the mapping solution is calculated using Bundle Adjustment based on the EOPs, IOPs and matched points between images.

FIG. 14 is a schematic block diagram illustrating one embodiment of a computer system 1400 configurable for mobile mapping systems. In one embodiment, a mobile device may be implemented on a computer system similar to the computer system 1400 described in FIG. 14.

As illustrated, computer system 1400 includes one or more processors 1402A-N coupled to a system memory 1404 via bus 1406. Computer system 1400 further includes network interface 1408 coupled to bus 1406, and input/output (I/O) controller(s) 1410, coupled to devices such as cursor control device 1412, keyboard 1414, and display(s) 1416. In some embodiments, a given entity (e.g., a smartphone) may be implemented using a single instance of computer system 1400, while in other embodiments multiple such systems, or multiple nodes making up computer system 1400, may be configured to host different portions or instances of embodiments.

In various embodiments, computer system 1400 may be a single-processor system including one processor 1402A, or a multi-processor system including two or more processors 1402A-N (e.g., two, four, eight, or another suitable number). Processor(s) 1402A-N may be any processor capable of executing program instructions. For example, in various embodiments, processor(s) 1402A-N may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processor(s) 1402A-N may commonly, but not necessarily, implement the same ISA. Also, in some embodiments, at least one processor(s) 1402A-N may be a graphics processing unit (GPU) or other dedicated graphics-rendering device.

System memory 1404 may be configured to store program instructions and/or data accessible by processor(s) 1402A-N. For example, memory 1404 may be used to store software program and/or database shown in FIG. 13. In various embodiments, system memory 1404 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described above, may be stored within system memory 1404 as program instructions 1409 and data storage 1410, respectively. In other embodiments, program instructions and/or data may be received, sent or stored upon different types of computer-accessible media or on similar media separate from system memory 1404 or computer system 1400. Generally speaking, a computer-accessible medium may include any tangible, non-transitory storage media or memory media such as electronic, magnetic, or optical media—e.g., disk or CD/DVD-ROM coupled to computer system 1400 via bus 1406, or non-volatile memory storage (e.g., "flash" memory)

The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 1406 may be configured to coordinate I/O traffic between processor 1402, system memory 1404, and any peripheral devices including network interface 1408 or other peripheral interfaces, connected via I/O controller(s) 1410. In some embodiments, bus 1406 may perform any necessary protocol, timing or other data transformations to convert data signals from one component (e.g., system memory 1404) into a format suitable for use by another component (e.g., processor(s) 1402A-N). In some embodiments, bus 1406 may include support for devices attached through various types of peripheral buses, such as a variant of the Peripheral Component Interconnect (PCI) bus standard or the Universal Serial Bus (USB) standard, for example. In some embodiments, the operations of bus 1406 may be split into two or more separate components, such as a north bridge and a south bridge, for example. In addition, in some embodiments some or all of the operations of bus 1406, such as an interface to system memory 1404, may be incorporated directly into processor(s) 1402A-N.

Network interface 1408 may be configured to allow data to be exchanged between computer system 1400 and other devices, such as other computer systems attached to a mobile device, for example. In various embodiments, network interface 1408 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

I/O controller(s) 1410 may, in some embodiments, enable connection to one or more display terminals, keyboards, keypads, touch screens, scanning devices, voice or optical recognition devices, or any other devices suitable for entering or retrieving data by one or more computer system 1400. Multiple input/output devices may be present in computer system 1400 or may be distributed on various nodes of computer system 1400. In some embodiments, similar I/O devices may be separate from computer system 1400 and may interact with computer system 1400 through a wired or wireless connection, such as over network interface 1408.

As shown in FIG. 14, memory 1404 may include program instructions 1409, configured to implement certain embodiments described herein, and data storage 1410, comprising various data accessible by program instructions 1409. In an embodiment, program instructions 1409 may include software elements of embodiments illustrated in FIG. 13. For example, program instructions 1409 may be implemented in various embodiments using any desired programming language, scripting language, or combination of programming languages and/or scripting languages. Data storage 1410 may include data that may be used in these embodiments such as, for example, MMS. In other embodiments, other or different software elements and data may be included.

A person of ordinary skill in the art will appreciate that computer system 1400 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

Embodiments of mobile devices described in FIGS. 2-4 may be implemented in a computer system that is similar to computer system 1400. In one embodiment, the elements described in reference to GPS or sensors may be implemented in discrete hardware modules. Alternatively, the elements may be implemented in software-defined modules which are executable by one or more of processors 1402A-N, for example.

EXAMPLES

Example horizontal mapping solutions with and without using control points are shown in FIGS. 11 and 12. In FIG. 11, the final mapping solution is precise but not accurate since the absolute accuracy of the mapping solution is mainly governed by the initial accuracies of the calculated GPS position and azimuth angle of the first image (reference image) which have not been corrected. In addition, the errors between GPS receiver measurements propagate to affect the scale of the mapping solution. A more accurate result is obtained using two GCP as shown in FIG. 12. The maximum errors and RMSE values in the final solution using one control point to shift the mapping results and two control points to shift, rotate and scale the same results are listed in Tables 2 and 3 respectively. Better results may be obtained using two control points where the maximum errors in the horizontal and vertical direction did not exceed 32 cm and 50 cm with RMSE values of 19 cm and 26 cm respectively.

TABLE 2

Maximum errors and its RMSE in north, east, up and 3D space using one GCP.

|  | North | East | Up | Horizontal | 3D |
|---|---|---|---|---|---|
| Maximum Error (m) | 2.82 | 2.51 | 0.62 | 2.83 | 2.84 |
| RMSE (m) | 1.28 | 1.15 | 0.26 | 1.72 | 1.74 |

TABLE 3

Maximum errors and its RMSE in north, east, up and 3D space using two GCP.

|  | North | East | Up | Horizontal | 3D |
|---|---|---|---|---|---|
| Maximum Error (m) | 0.29 | 0.30 | 0.49 | 0.31 | 0.58 |
| RMSE (m) | 0.15 | 0.12 | 0.26 | 0.19 | 0.32 |

To investigate the precision of using the proposed system for simple modelling applications, a building which contains rectangular surfaces was modelled using eight captured images without using any GCPs. The modelled building, which contains a set of rectangular solar cells, a door and a window, is shown in FIG. 15.

The final modelling solution is obtained using three steps. In the first step, the proposed system is used to calculate the changes of the 3D coordinates of the interest points in the east, north and up directions (ΔE, ΔN and ΔU) with respect to the location of the first captured image as shown in black dots in FIG. 16. In the second step, using the fact that the sizes of all solar cells are equal, the 3D coordinates of the edges of all solar cells are calculated. FIG. 17 shows the grid model of the mapped building obtained from the first and the second steps in black and red dots respectively. Texturing the grid model solution is the last step to obtain the final model as shown in FIG. 18 and FIG. 19

To test the precision and the relative accuracy of the obtained modelling solution, the true lengths of six edges, shown in FIG. 19, of the building were measured and the different ratios between them were calculated. These calculated ratios are then compared to the measured ones as shown in Table 4. As can be noticed from this table, the percentage of the modelling errors did not exceed 3% on average.

TABLE 4

The true and solution ratios between various edges of the modelled solution.

| First edge/second edge | True Ratio | Solution Ratio | Percentage |
|---|---|---|---|
| 1/2 | 0.6061 | 0.5992 | 98.86% |
| 3/4 | 1.8837 | 1.8901 | 99.66% |
| 5/6 | 1.1538 | 1.2200 | 94.26% |
| 2/3 | 0.6790 | 0.6889 | 98.54% |
| 2/5 | 0.6875 | 0.6513 | 94.73% |
|  | Average |  | 97.21% |

The described systems may be used to measure lengths of various objects. As an example, eleven images are captured and used to measure the lengths of various edges in the façade of Roger Jackson Center at University of Calgary. The locations of the captured images on Google® Earth are shown in FIG. 20 and the measured edges are shown in FIG. 21. The true and the measured lengths of the measured edges without using any GCP are listed in Table 5 where the average error percentage of the measured lengths was less than 8%.

TABLE 5

Measured lengths.

| Edge number | True length (m) | Measured length (m) | Error (%) |
|---|---|---|---|
| 1 | 31.87 | 33.31 | 4.52 |
| 2 | 15.05 | 15.27 | 1.46 |
| 3 | 7.5 | 7.80 | 3.98 |
| 4 | 1.30 | 1.26 | 2.78 |
| 5 | 2.65 | 3.04 | 14.65 |
| 6 | 2.04 | 2.33 | 14.28 |
| 7 | 2.48 | 2.80 | 12.74 |
| 8 | 2.48 | 2.65 | 6.65 |
| Average error percentage |  |  | 7.63 |

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A method comprising:
capturing a plurality of images using a camera of a hand-holdable mobile communication platform;
determining an initial set of orientation parameters associated with the plurality of captured images in response to one or more orientation sensors on the hand-holdable mobile communication platform;
initially matching images of the plurality of captured images based on matching object points between respective pairs of first and second matched images;
calculating, using a selected pair of matched images consisting of a first matched image having a first object point and a second matched image having a second object point matched to the first object point, a corrected set of orientation parameters based on the initial set of orientation parameters and application of a non-linear least square estimation algorithm to a cost function, wherein, the cost function is a separation distance between the second object point and an epipolar line of the second matched image, and wherein the epipolar line is expressed as a function of a plurality of points in the second matched image obtained using a projection between the matched images in the selected pair that is a function of orientation parameters, by projecting the first object point to the plurality of points in the second matched image; and
estimating a three-dimensional ground coordinate associated with the captured images in response to the corrected set of orientation parameters.

2. The method of claim 1, wherein the set of orientation parameters comprise External Orientation Parameters (EOPs).

3. The method of claim 2, wherein the EOPs are determined using an onboard Global Positioning Satellite (GPS) system.

4. The method of claim 2, wherein the EOPs are determined using an onboard accelerometer and magnetometer.

5. The method of claim 1, wherein the set of orientation parameters comprise Internal Orientation Parameters (IOPs).

6. The method of claim 1, further comprising detecting and removing blunders in the matched object points.

7. The method of claim 1, wherein estimating the three-dimensional ground coordinate is calculated using a bundle adjustment algorithm.

8. A mobile mapping system, comprising:
a hand-holdable mobile communication platform comprising one or more processors and a memory storing instructions; wherein,
when executed by the one or more processors, the instructions cause the one or more processors to perform the following operations:
capturing a plurality of images using a camera onboard the hand-holdable mobile communication platform;
determining an initial set of orientation parameters associated with the plurality of captured images in response to one or more orientation sensors on the hand-holdable mobile communication platform;
initially matching images of the plurality of captured images based on matching object points between respective pairs of first and second matched images;
calculating, using a selected pair of matched images consisting of a first matched image having a first object point and a second matched image having a second object point matched to the first object point, a corrected set of orientation parameters based on the initial set of orientation parameters and application of a non-linear least square estimation algorithm to a cost function, wherein, the cost function is a separation distance between the second object point and an epipolar line of the second matched image, and wherein the epipolar line is expressed as a function of a plurality of points in the second matched image obtained using a projection between the matched images in the selected pair that is a function of orientation parameters, by projecting the first object point to the plurality of points in the second matched image; and
estimating a three-dimensional ground coordinate associated with the captured images in response to the corrected set of orientation parameters.

9. The MMS of claim 8, wherein the set of orientation parameters comprise External Orientation Parameters (EOPs).

10. The MMS of claim 9, wherein the EOPs are determined using an onboard Global Positioning Satellite (GPS) system.

11. The MMS of claim 9, wherein the EOPs are determined using an onboard accelerometer and magnetometer.

12. The MMS of claim 8, wherein the set of orientation parameters comprise Internal Orientation Parameters (IOPs).

13. The MMS of claim 8, wherein the hand-holdable mobile communication platform is further configured to detect and remove blunders in the matched object points.

14. The MMS of claim 8, wherein estimating the three-dimensional ground coordinate is calculated using a bundle adjustment algorithm.

* * * * *